Figure 1:
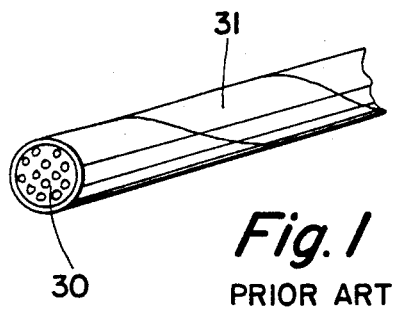

United States Patent [19]

Crawford, Jr. et al.

[11] Patent Number: 5,026,595
[45] Date of Patent: Jun. 25, 1991

[54] WOVEN GAP FILLER FOR USE IN THE LAY-UP OF COMPOSITE PLASTIC STRUCTURAL UNITS

[75] Inventors: James A. Crawford, Jr.; Keith E. Burgess, both of Kennebunk, Me.

[73] Assignee: Techniweave, Inc., Rochester, N.H.

[21] Appl. No.: 433,839

[22] Filed: Nov. 9, 1989

[51] Int. Cl.$^5$ ............................................. B32B 7/00
[52] U.S. Cl. .................................. 428/246; 428/143; 428/221; 428/222; 428/225; 428/257; 428/246; 428/408; 428/902; 428/413
[58] Field of Search ............... 428/257, 408, 296, 413, 428/902, 221, 225, 246, 222, 193

[56] References Cited

U.S. PATENT DOCUMENTS

| | | | |
|---|---|---|---|
| 4,259,821 | 4/1981 | Bush | 428/902 |
| 4,308,309 | 12/1981 | Frosch et al. | 428/257 |
| 4,331,723 | 5/1982 | Hamm | 428/902 |
| 4,379,798 | 4/1983 | Palmer et al. | 428/257 |
| 4,467,838 | 8/1984 | Rheaume | 428/902 |
| 4,510,198 | 4/1985 | Rheaume | 428/902 |
| 4,584,226 | 4/1986 | Vitale et al. | 428/902 |
| 4,913,955 | 4/1990 | Noda et al. | 428/902 |

*Primary Examiner*—James J. Bell
*Attorney, Agent, or Firm*—Laforest S. Saulsbury

[57] ABSTRACT

A woven fabric gap filler with carbon fiber yarns providing a central gap filling group section of large diameter warp yarns assuming a triangular sectional shape with tab portions extending respectively from the respective apexes of the triangular filler section to be held between lay-up of opposing graphite epoxy fabric rib and flange sheets for integration therewith and to retain the apexes of the filler section against shrinkage when the assembly is heat treated. Under stress of the hard plastic structural unit, the forces will be passed through transverse fabric woof yarns as well as through longitudinal warp yarn strands so as to resist breakdown of hard plastic within the gap filling section of the structural unit when stressed.

8 Claims, 5 Drawing Sheets

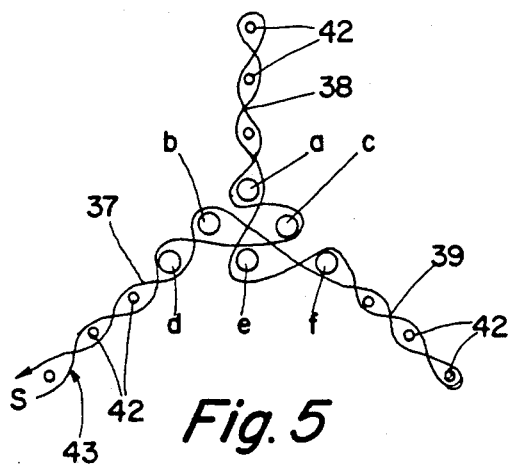
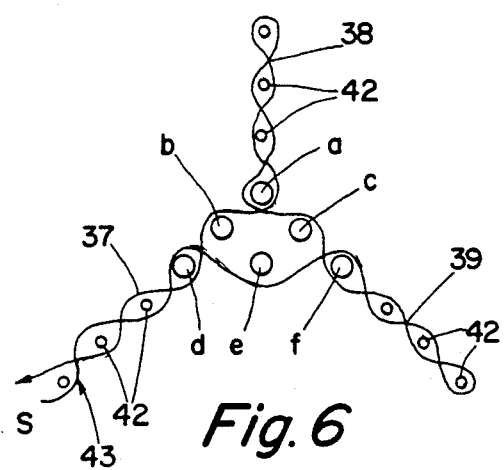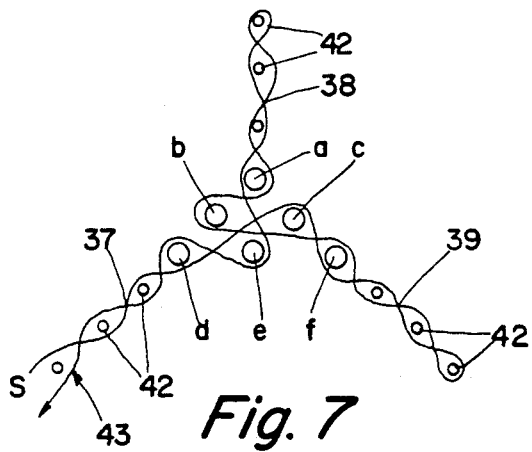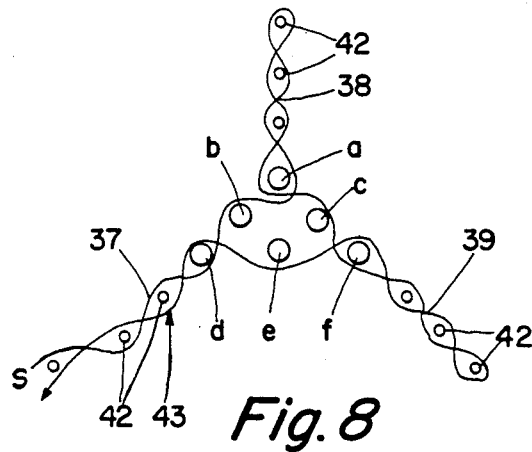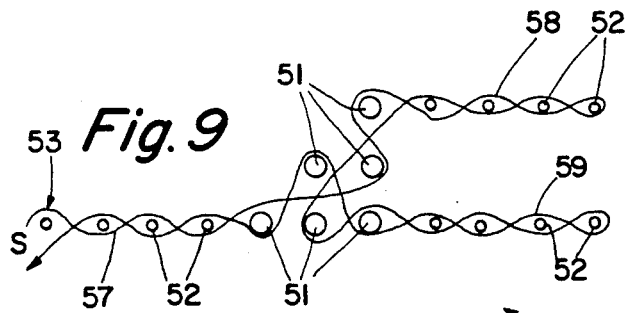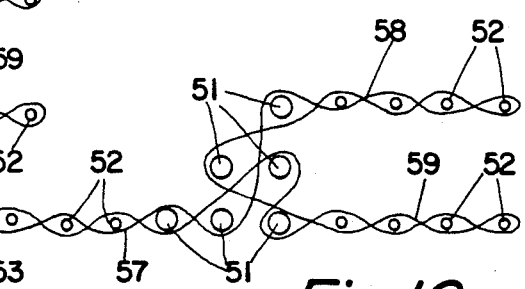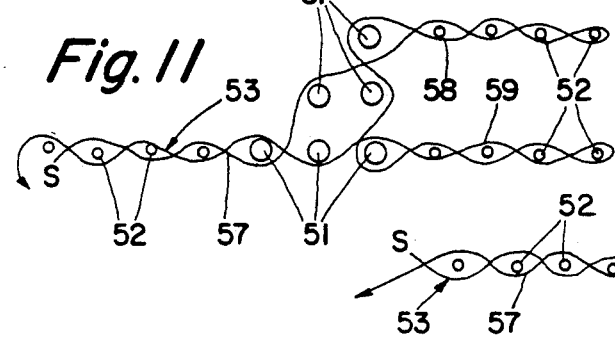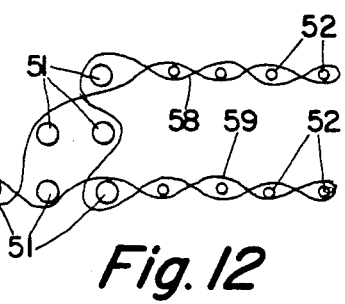

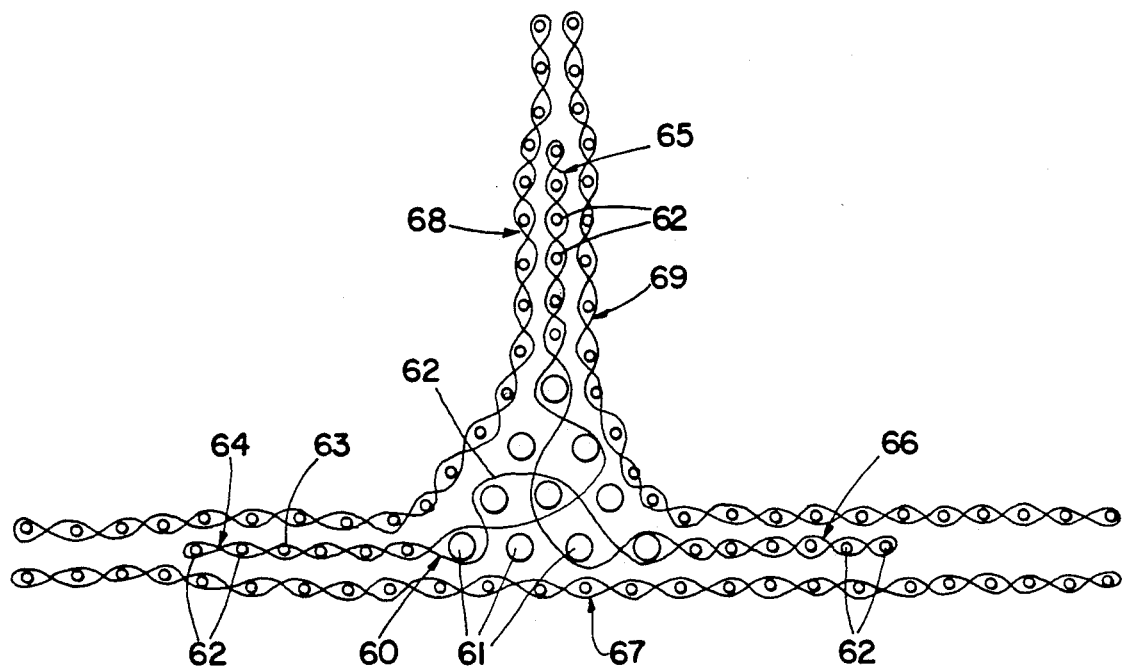
Fig. 15
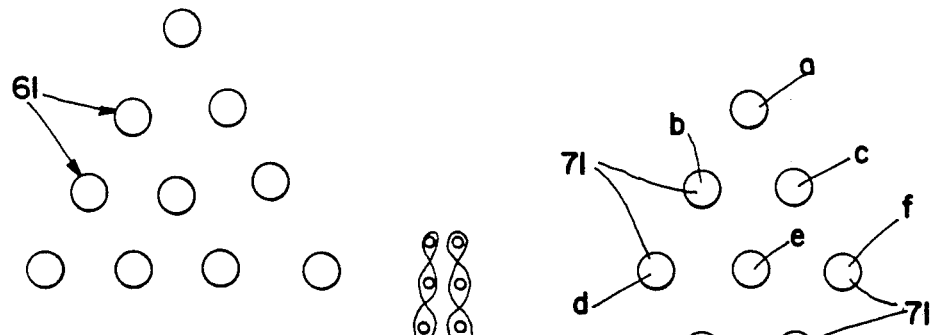
Fig. 16
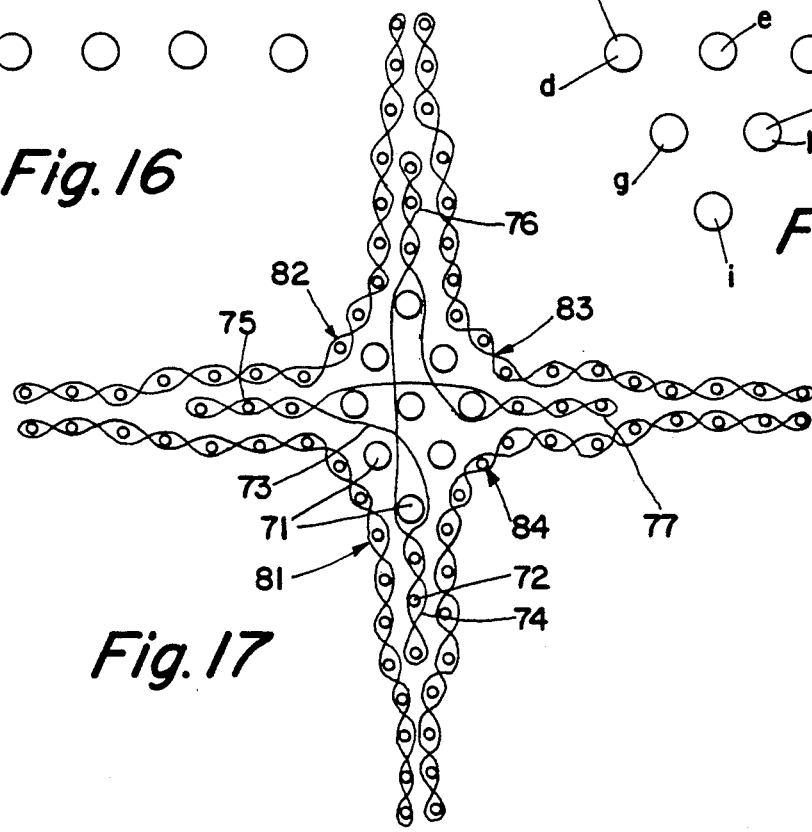
Fig. 17
Fig. 18

WOVEN GAP FILLER FOR USE IN THE LAY-UP OF COMPOSITE PLASTIC STRUCTURAL UNITS

This invention relates to composite plastic lay-up structural units and more particularly to woven gap fillers therefor.

Without adequate gap filling material, gaps and voids between the ribs and flanges of T and I-section structural units made up from such gap material and multiple layers of graphite epoxy fabric sheets are left with no lateral fibers to transfer stresses through the gap filling material weaken the structural unit. Mere use of strand of rope or yarns not reinforced, are inadequate. Such graphite epoxy fabric sheets, as used in these structural units, are not pliable enough to bend into sharp corners and remain tightly therein. Therefore satisfactory gap fillers have to be provided over which the layers of the fabric will be extended without being sharply bent into a small radius. Fabricators have, heretofore, filled these gaps generally of triangular section with rope, unidirectional tow, braid, or fibers in any form so that upon completion of heat treatment that converts the resin into hard plastic so that the gap is filled predominantly with non-reinforced plastic, a) one incapable of withstanding high stress. Such joints of reinforced fabric plastic without fiber reinforcing become points of failure under certain high lateral load conditions. With all such gap filling techniques thus far used, none have been satisfactory since the problem of high resin content within the gap still remains and breakdown results since there is no lateral reinforcing within these fillers for the lateral transmission of stresses.

Composite plastic structural units are used much in the aerospace, marine and sporting goods field and has many other industrial applications wherein high strength, light weight and stiffness for plastic structural units are needed. Such units generally take the form of T-section, I-beam and C-channels made with lay-ups of multiple graphite epoxy fabric sheets that with final heat treatment provide a hardened plastic article having these desired characteristics.

Within these final structural units, fiber yarn strands reinforce the polymer resin and function as the load bearing means for the unit while the resin transfers the load between the fiber strands. Resins are strained more in the elongation than are the reinforcing yarn fiber strands. Fiber reinforcement within the fabric may be made of chopped fibers lying random in a mat formation or in warp and woof yarns made of carbon fibers. While yarns of carbon fibers are strong in tension, they are weak in shear but when woven in a warp and woof manner, the weakness in shear is overcome and the yarns are supportive of one another running in cross direction as they do. Gap fillers as needed for producing the composite plastic units should thus be woven as are the layer fabric sheets rather than be mere unidirectional strands. The problem of high resin content within the gap and discontinuity of the gap filling material can still persist without transverse reinforcing strands.

Accordingly, it is one of the principal objects of the present invention to provide a woven gap filler for use in the lay-up composite plastic fabric structured units so as to have transverse reinforcing strands along with the longitudinal gap filling strands.

It is also a principal object of the invention to provide a gap filler for use in the lay-up composite plastic structured units that will not release, discontinue or be weakened with use of the structured unit.

It is another object of the invention to provide a woven gap filler for use in the lay-up composite plastic structures that will be woven from carbon fiber yarns with large diameter warp filling yarns adapted to run longitudinally through the gap but retained by transversely-extending woof yarns.

It is still another object of the invention to provide a woven gap filler for use in the lay-up composite plastic structures that will have a triangular-shaped section of filling yarn material that is woven and without need of a molding procedure to shape for its application with the lay-up plastic sheets thereupon and a woven product ready for immediate use as a gap filler.

It is still another object of the invention to provide a woven gap filler for use in the lay-up composite plastic fabric which will have as well as a thick triangular-section made of multiple warp yarns that are traversed by woof yarns, but which will have single thickness tabs of woven yarns extending laterally from the apexes of the triangular filling region of the gap filler adapted to be flushly joined and retained between apposing lay-up fabric sheets whereby to retain the triangular-shaped filling yarns against shrinkage and dislocation within the gap joint.

It is further object of the invention to provide a woven gap filler for use in the lay-up composite plastic structural units formed of warp and woof yarns including a gap filling region with large diameter warp yarns and tab regions extending laterally from apexes of the gap filling region of smaller diameter yarns for direct integration between opposing lay-up fabric sheets of the rib and flange of the final structural unit.

It is a further object of the invention to provide a woven gap filler for use in the lay-up of composite plastic structures that may be varied in size and shape by merely varying the number and diameter of the warp yarns that are used in the weaving pattern for the yarns.

It is still further object of the invention to provide a woven gap filler for use in the lay-up of composite plastic structures made by weaving carbon fiber yarns to which polymer resins will readily adhere.

Still further objects of the invention are to provide a woven gap filler for use in the lay-up of composite plastic structures having the above objects in mind, which will be inexpensive to manufacture, offered as a solitary item, light in weight, easily blended with polymer resin, adapted for ready use with lay-up fabrics, easily integrated with resin impregnate fabric on being heat treated, efficient and effective in use.

Figure 2:
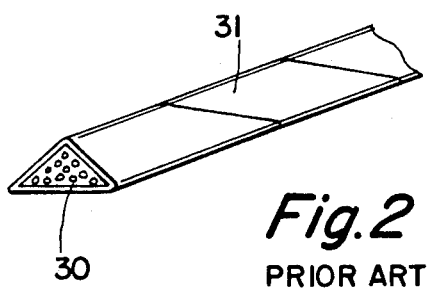
Figure 3:
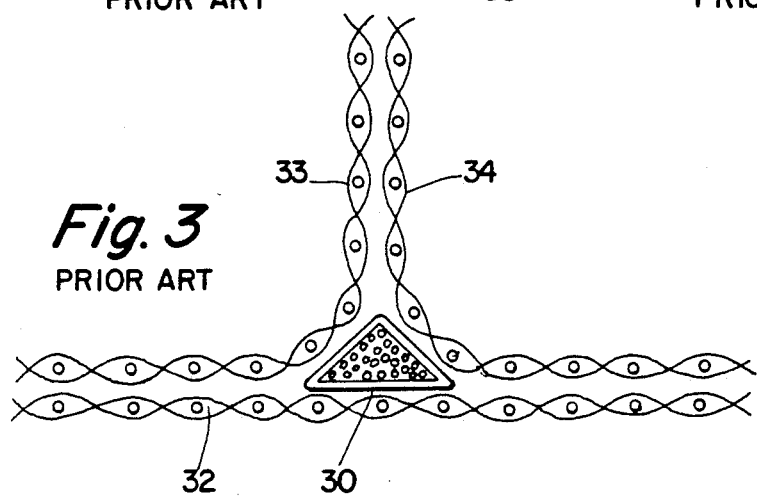
Figure 4:
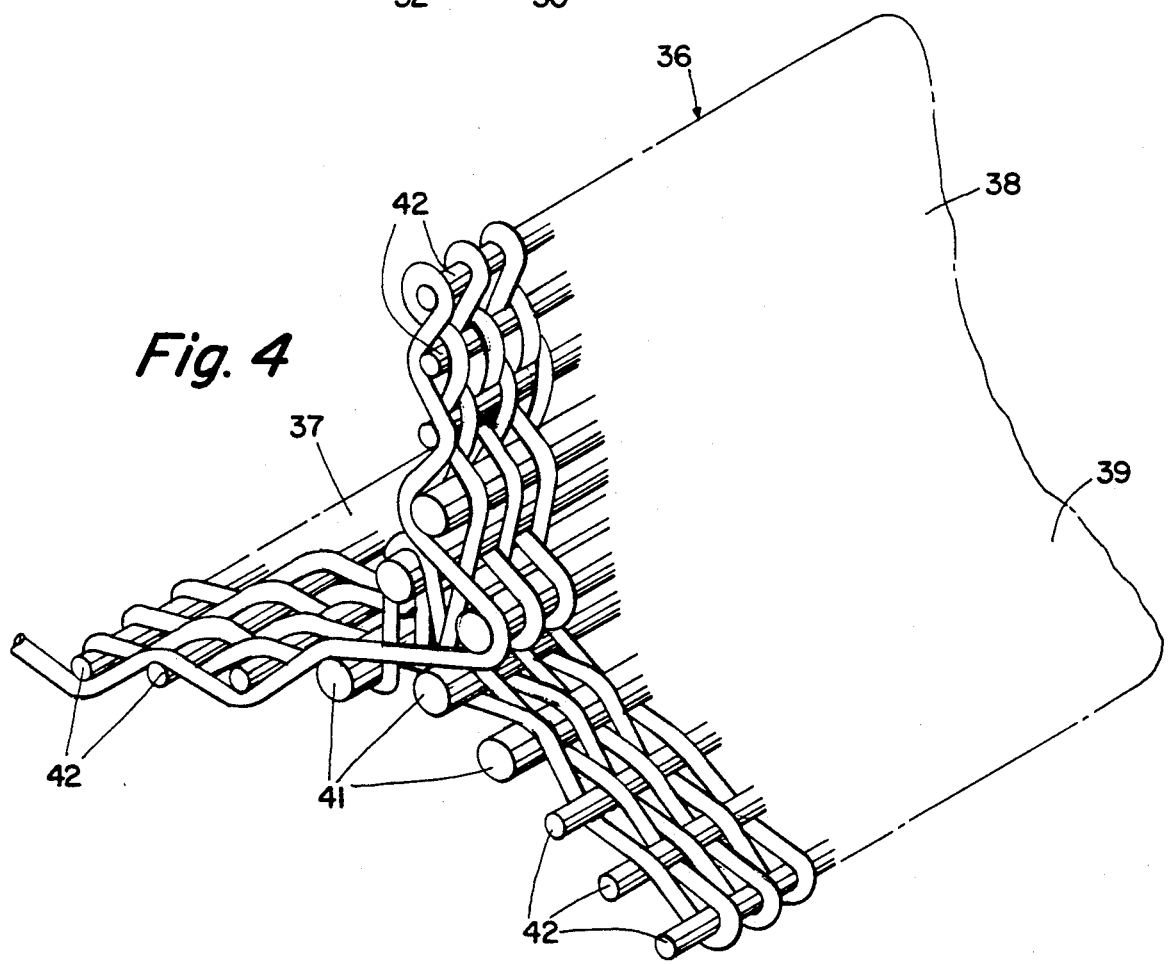
Figure 13:
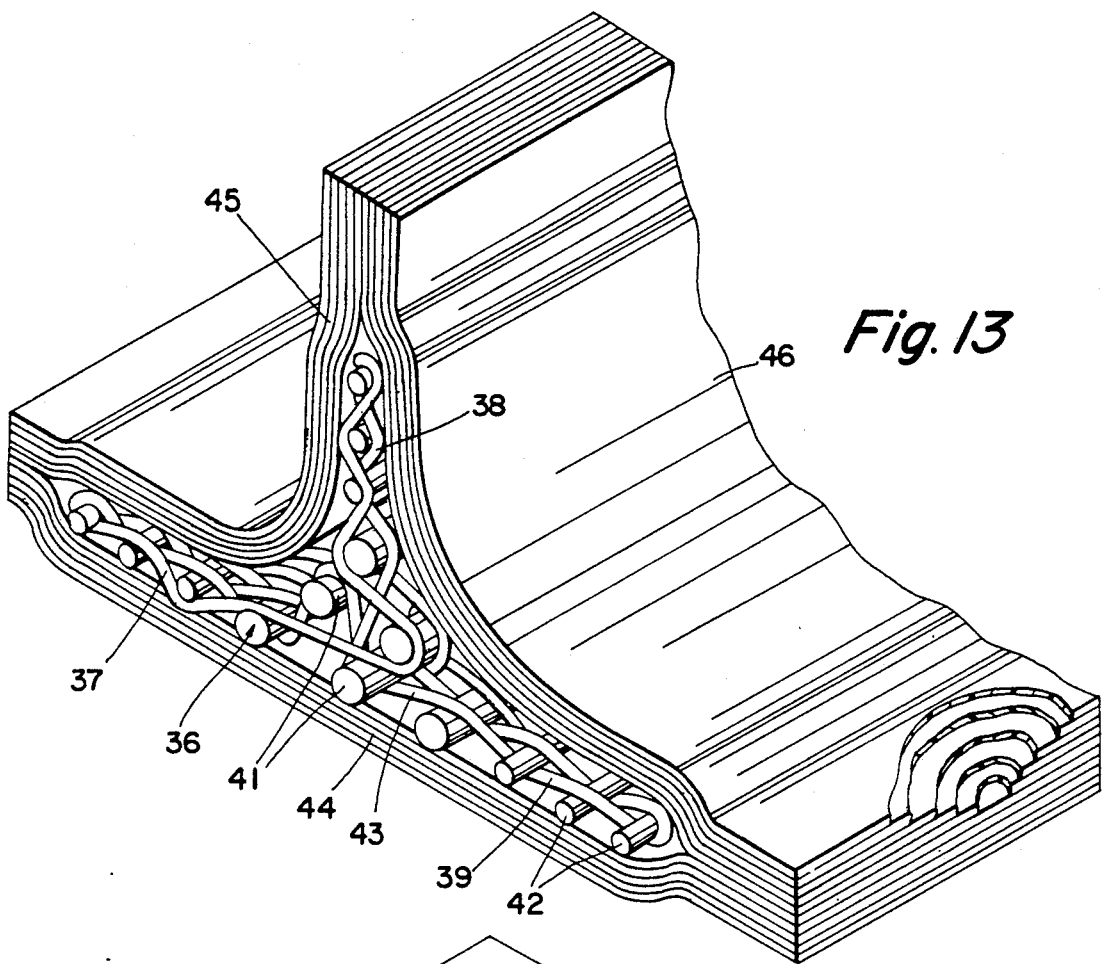
Figure 14:
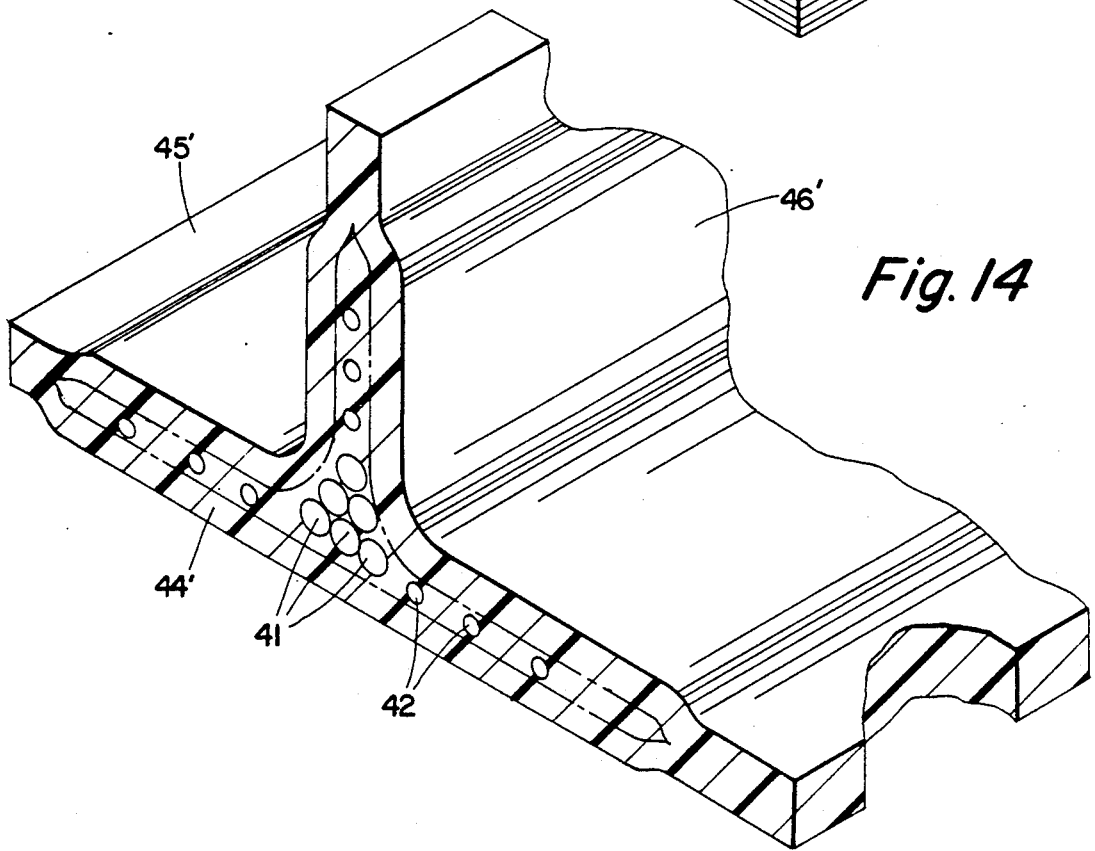

For a better understanding of the invention, reference may be had to the following detailed description taken in connection with the accompanied drawing, in which FIG. 1 is a fragmentary perspective of a gap filler of the prior art made from strands of rope or the like and wrapped with a covering, FIG. 2 is a similar fragmentary perspective view of the same prior gap filler after it has been molded or compressed into triangular section for use in the lay-up of plastic fiber sheets, FIG. 3 is an illustrative elevational view of the gap filler of FIG. 2 illustrating the manner in which epoxy fabric sheets are laid upon the gap filler to provide rib and flange of a plastic structural unit, FIG. 4 is an enlarged fragmentary perspective view of the woven gap filler embodying the features of the present invention, FIGS. 5, 6, 7 and 8 are diagrammatic views illustrating respectively four steps in the weaving process of the filling and tab yarns for the gap filler of FIG. 4, FIGS. 9, 10, 11 and 12 are respectively diagrammatic views with warp yarns flattened and positioned as they are in the textile machine when the weaving process with the woof yarn is passed therebetween and with the same number of large diameter filling yarns but with four small yarns for the tabs instead of but three tab yarns of FIG. 4, FIG. 13 is an enlarged fragmentary perspective view of a lay-up assemblage of epoxy fabric sheets upon the gap filler of FIG. 4 preparatory to heat treatment, FIG. 14 is a similar view of the assemblage of FIG. 13 after it has been integrated by heat treatment to provide the final structural unit, FIG. 15 is a diagrammatic elevation view of a gap filler with ten large diameter yarns and increased length tabs of five small yarns, and with lay-up fabric sheets extended thereover, FIG. 16 is a diagrammatic plan view illustrating the triangular layout of the ten large diameter filler yarns of FIG. 15, FIG. 17 is a diagrammatic view of a gap filler with four tabs extending from a diamond-section filler region of ten filler yarns, FIG. 18 is a diagrammatic plan view illustration the diamond-shaped layout of the ten filler yarns of FIG. 17.

FIGS. 19, 20, 21 and 22 are respectively diagrammatic views illustrating four steps in the weaving process of the filler and tab yarns of the gap filler of FIG. 17.

Referring now to FIGS. 1, 2 and 3 illustrating the gap filling for composite plastic structural unit that has been done heretofore simply with continuous strands of yarns, ropes or braids extended as indicated at 30 and wrapped with a covering 31 with tacky substance maintain the strands when the assembly compressed into triangular shaped section as shown in FIG. 2 for the lay-up of a rib and flange structure unit in the manner illustrated in FIG. 3.

With the wrapped strands of yarn, ropes or braids having been compressed or extruded into triangular section shape so that the fabric covering 31 will lay flush along the three cornerless sides of the gap filler in the manner illustrated in FIG. 3, resin impregnated fabric bottom and opposite side layers 32, 33 and 34 of multiple lay-up respectively upon the fabric sheets are laid respective sides of the gap filler. The final assembly is heat-treated to harden the mass and provide a desired T-section shaped structural unit.

In the use of the structural units formed of prior gap fillers much stress occurs at the apexes of the triangle T-section gap filler. With mere yarns, ropes or braids running side-by-side together unattached transversely so that lateral stresses are not transmitted through the triangle of a T-section unit to the opposite side of the unit, a very weak structure has resulted. Since the mere grouping of the strands of the prior art are without the transverse strands to effect a woven fabric for the transmission of lateral stress, little strength has been provided by the gap filler of the prior art. Such a gap filler has done little more than fill space and provide a form against which epoxy fabric sheets may be laid. The epoxy fabric sheets have to be laid into rounded corners and sharp folds of them have to be avoided. For the proper structure, the gap filler needs to be of fabric with transverse yarns like with sheets a lay-up 32, 33 and 34, the fabric and the triangular section gap filler to be effective. Also, a woven gap filler with tab extensions at the apexes of the triangular shape will hold the filling strands in place and ease the transfer of stresses from the rib and flange therethrough.

Accordingly, there has been devised a gap filler that will be woven, as are the lay-up epoxy sheets themselves, of carbon fiber yarns to give adequate fullness within the gap with both warp and woof yarns that are preferably of varying diameters if need be, large of the center yarns and less of the tab yarns extending from the center yarn apexes. A complete fabric gap filler has been provided such that can be produced on a textile machine from some several carbon filler warp yarns running into the machine from a changing harness set-up worked to separate the yarn strands to allow for passage of the similar carbon fiber woof strands thereacross through momentary adjustment to weave the fabric and through different separations with each later pass of the shuttle and in a repetitive manner after four separations. The woven gap filler will continue through the machine to any length and can be cut therefrom. The carbon or graphite threads themselves will have been made into any desired diameter strands from carbon fibers that are most strong in tension and weak in shear but when impregnated with resin and heat treated becomes a hardened plastic mass reinforced.

In FIG. 4, there is best shown the general arrangement of the carbon fiber strands of the gap filler as constructed in accordance with the present invention. Such gap filler is woven fabric and not mere strands of yarn, rope or braid of FIG. 1, 2 and 3 with a covering and pressed into a desired shape. The gap filler is indicated in its entirety at 36 and comprises some six large diameter warp strands of carbon fiber yarn 41 that serve to make up the triangular filling section of the gap filler and less diameter strands 42 for tab or leg portions extending 37, 38 and 39 from the respective apexes of the triangular section of the large diameter strands.

Three small diameter strands are shown with each tab portion. More or fewer number of warp yarns could have been selected for both the triangular section and the tab sections. Any quantity, size and shape for the yarns can be used in the triangular section to best suit the application, as will be apparent from modifications to be later described.

In FIGS. 5, 6, 7 and 8 three-tab gap filler is diagrammatically illustrated in which the weaving is done in four steps to complete the weave architecture over the large diameter warp yarns 41 of the gap filling section and the small diameter yarns 42 of the tab portions 37, 38 and 39. While six large diameter yarns 41 have been shown and three small diameter yarns 42 have been selected for this particular gap filler, it should again be apparent that other selections may be made of comparative size and number of gap filling and tab yarns. These warp yarns 41 and 42 can thus be of the different sizes or even of the same size and varying in number for the gap filling section and tab portions. The number of yarns in the different tab portions may vary from one another. For instance, it may be desired to have four yarns in one tab portion while still only three in the other tab portions.

In these FIGS. 5, 6, 7 and 8, there is illustrated merely one of many possible sequences for the weaving of the transverse, woof yarns over the warp yarns in the transverse or filling directions. The diameter of the transverse shute or woof yarns may be of any desired diameter but are preferably of the diameter of the tab warp yarns, all illustrations are made with but a single line for clarity purposes. The woof yarns are preferably made of carbon fibers such as are the warp yarns. The fabric can be woven manually or with conventional textile machines with adequate harness to separate the warp yarns to accommodate the passage of the shute that dispenses the woof yarns.

While any number of different passes of the woof filling yarns indicated by a single line 43 in the Figures may be made between and over the warp yarns 41 of the filler section and warp yarns 42 of the tab portion. The selected passes of woof yarn 43 start in FIG. 5 at S with the outer end of the left tab portion 37 runs alternately over the three tab yarns 42 thereof and thenabout large diameter filler yarns d-c-a alternately upwardly and downwardly about yarns 42 of tab portion 38, over large yarns a-e-f down and up small yarns 42 of tab 39, about large yarns f-b-d to return down small yarns of tab portion 37, the shute having made one pass and ready for return transverse of the textile machine.

In FIG. 6, a pass is made in continuation of FIG. 5. The woof yarn 43 is similarly woven over small yarns 42 of tab 37, passed about large diameter, yarn d under e and about f, down and up tab 39, about a-b-d vp and down tab 38 and return down 37 to end the this sequence.

In FIG. 7, a pass somewhat like FIG. 5 is made but from a different direction. The start is made again with woof yarn 43 at S on the tab 37 and passes alternately over its small yarns 42 thereof, under large yarn d, across and about large yarn c, down large yarn f of tab 39 and return to across and about yarn b, under and about large yarn a and alternately up and down small yarns 42 of tab 38 and return over and about yarns a-e-d for final return down starting tab 37.

With the final pass of the sequence as shown in FIG. 8, yarn 42 again starts at S on tab 37, about large diameter filling yarns d-b-a, alternately up and down tab 38, about large yarns a-c-f and down and up tab 39, across and about large yarns f-e-d, and return down tab 37 with the four passes and cycle will have been completed. The next cycle will start with FIG. 5 a woven gap filler with large yarns of gap filling material will be produced and adequately retained against separation by woven woof strands of yarn 43.

This gap filling fabric so produced has particular application in the lay-up of composite structural units by the placing of layers of graphite epoxy fabric sheets and spread in the manner best illustrated in FIG. 13 builds a T-section structural unit ready for heat treatment. Such epoxy fabric sheets cannot be pressed into sharp corners and hence the principal reason for gap fillers is to provide rounded corners for lay-up of the fabric. In FIG. 13, the gap filler generally designated at 36 is used. A gap filling section or region 41 will have been provided from the six large diameter yarns a, b, c, d and g making a triangular section with apexes from which respectively extend tabs 37, 38 and 39. The tabs 37 and 39 run coextensively to provide a bottom while the tab 38 extends perpendicularly therefrom. The tabs are of single thickness and are adhered between adjacent layers of fabric thereby to hold the apexes of the filler section extended in place and the filler section against shrinkage.

Bottom flange layers 44 of fabric are over tabs 37, 39 and the intermediate filler region 41 and adhered thereto. The entire gap filler 36 which will preferably have been impregnated with tacky epoxy resin the same as the fabric layer sheets will have been. Opposing multiple layers 45 and 46 of the fabric are spread respectively over the opposite faces of the perpendicular tab 38 and rounded into the respective opposite sides of the triangular filler section 41 and over tab portion 37, 38 and 39 and matching with the bottom layers 44. While only one joint has been illustrated to provide a T-section, it should be easily apparent that with two such gap fillers an I-beam structure can be provided. C-shape channels with gap filler may be perfected. The tacky mass of FIG. 13 of gap filler 36 and the fabric layers 44, 45 and 46 are now made ready for curing and heat treatment to make for a solid reinforced plastic mass as illustrated in FIG. 14. The carbon fiber yarns will remain strong in tension and lateral stresses will be transmitted by the woof yarn 43 between the cured sides of the unit. The carbon fiber yarns of themselves are strong in tension and weak in shear but when woven into fabric they reinforce one another and are embedded in plastic readily transmit forces in any direction.

In FIG. 14, the completed structural unit is shown. Since the gap filler 36 will have been treated with epoxy resin, or even if not so treated, the gap filler will have merged with the epoxy fabric sheets to provide a solid plastic mass and both reinforced by their warp and woof yarns. No pockets are left nor are the yarns displaced over one another and extended out for longitudinal alignment. The longitudinally-extending filler yarns 41 will have been somewhat compacted. The fabric sheet layers 44, 45 and 46 will have become respectively solid plastic as indicated at 44', 45', and 46'.

It should be apparent that the same procedure can be used for producing I-section and channel shaped section structural units on providing a woven type gap filler especially adapted therefor. Another woven gap filler of diamond shape section will be later described.

In FIG. 9, 10, 11 and 12 is disclosed a diagrammatic showing of a gap filler that will be made of six large diameter filling yarns 51 similar in size and number of the yarn 41 or a, b, c, d, e, f and small diameter yarns 52 like of yarns 42 of the FIGS. 5 to 8 but offset laterally above one another more in actual relative position in which the warp yarns are dealt within the textile machine to effect the lateral weaving of woof yarn 53 to illustrate that any number of small warp yarn 52 may be used in tab portions 57, 58 and 59, four yarns are included in these tab portions instead of but three yarns in tab portions 37, 38 and 39 of the above described gap filler 36.

The tab portion 58 runs coextensively with the tab region 58 is shifted with the large filling yarns shifted 51 so as to fully overlie and run parallel with the tab portion 59. The finished woven gap filler is brought into symmetrical shape when put to use in the assembly of the structural units. There are four warp yarns 52 in each tab portion and woof yarn 53 is woven similarly in a manner just described is in connection with FIGS. 5, 6, 7 and 8 in four sequences to complete a cycle that will be repetitive. This is an illustration as to how the tab portions may be made longer.

In FIG. 15, there is illustrated a still different design of a gap filler generally indicated at 60 that will be composed of ten large diameter filling yarns 61 and the gap filling section and five small diameter warp yarns 62 woven with woof yarn 63 in each of tab portions 64, 65 and 66. In FIG. 16, the ten large diameter gap filling yarns 61 are singly shown in plan separate from the woof yarn 63. A letter designate of these large yarns 61 for the passing of the woof yarn 63 should not be needed as any pattern of weaving architecture to hold them in compact and snuggled relationship with one another will be sufficient. Any number sequence passes may be made to effect a repetitive cycle in the weaving process. The illustration does show that ten such large yarns can be used in a triangular section as well as can six yarns for the tab portions and as well provide for apexes from which the small yarn tab portions can be extended with more of the small yarns.

Again in FIG. 15, and 16 it is noted that the completed gap filler 60 has been assembled diagrammatically with layers of graphite epoxy fabric sheets 67, 68, and 69 over different surface areas of the gap filling section and singly aligned yarn tab portion being disposed flush between opposing layers outwardly of the apexes of the triangular filling section of the gap filler 60, but with the fabric layers of multiple fabric sheets 68 and 69 rounded into the triangular section sides with the tab filler. The bottom fabric layers 67 of multiple fabric sheets lie flush upon and adhere to underfaces of tab 64 and 66 and intermediate gap filling section. For convenience the fabric layers 67, 68 and 69 have been shown singly but are actually multiple plies of graphite epoxy fabric sheets.

To illustrate how a four tab gap filler would be constructed and to show another variation that gap fillers may take, reference is made to FIGS. 17 to 22. Large diameter warp yarns 71 of carbon fiber are arranged in a diamond shape pattern as seen in FIG. 18, that are severally indicated by letters a, b, c, d, e, f, g, h, i. There are nine of these large filler warp yarns 71 and while each of the four tab portions has three small warp yarns 72, a woof yarn 73 is passed alternately over the small yarns and different patterns through the nine large diameter filling yarns. Tab portions 74, 75, 76 and 77 respectively extend from each of the apexes of the diamond-arranged large diameter filler yarns 71.

Figure 19:
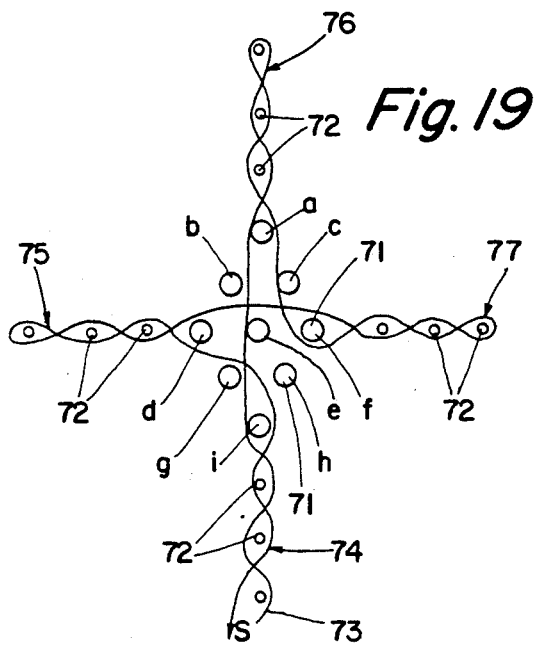

Starting as shown in FIG. 19, woof yarn 73 is passed upwardly and alternately over small yarns 72 of the depending tab 74 through large yarns 71 along i, e, a, and alternately through upwardly extending tab 76 and returned, then along a, c, f, laterally alternately through laterally-extending tab 77 and return transversely over large yarn f, e, d, to opposite laterally-extending tab 75 through and return to and along large yarns d, g, i, and finally passed down depending tab 74 to complete the pass.

Figure 20:
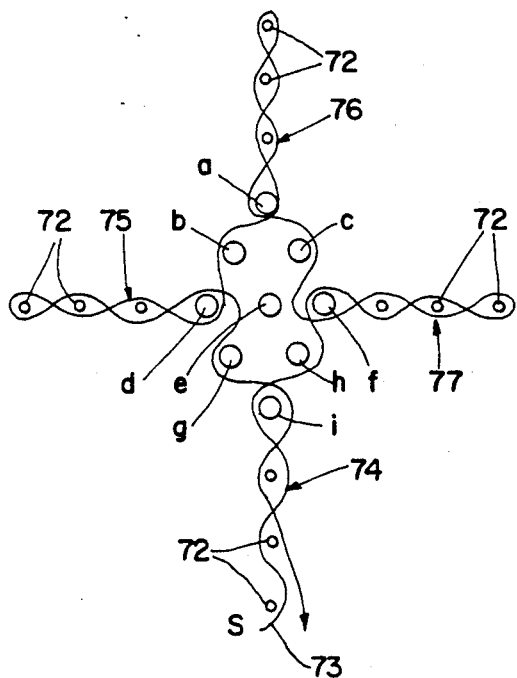
Figure 22:
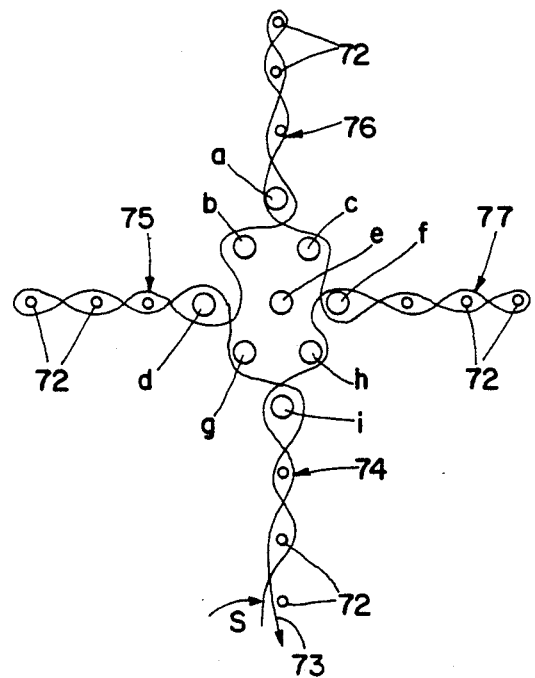

The next pass as shown in FIG. 20 also woof yarn starts from depending tab 74 passing upwardly and alternately over small yarns 72 and large filler yarns i, g, d, laterally outwardly in tab 75 returning to pass over large yarns d, b, a, through upwardly extending tab 76 and return, then over large yarns a, c, f, laterally through laterally-extending tab 77 and return to down over f, h, i, and small yarns in depending tab 74, leaving large yarn e free with four large yarns b, d, g and h which will be drawn upon as a free yarn on which to concentrate plastic mass.

Figure 21:
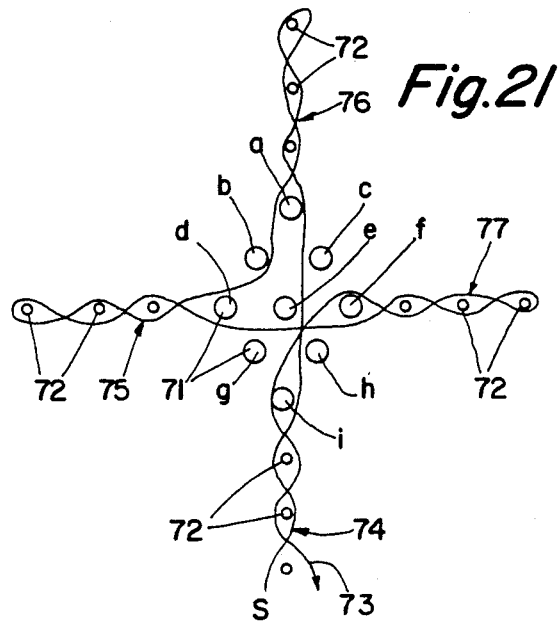

The pass of FIG. 21 is similar to the pass of FIG. 19 but again in different sequence through the tabs. The starting is still with the depending tab 74 alternately and upwardly over opposite side of yarns i, h and e laterally-extending tab 75 and return to cross under yarns d, e, f, to tab 77 and return over yarns f, h, i, and down depending tab 74 to complete another pass.

Again with one more pass to finish the cycle of four passes, the transverse shute yarn 73 passes alternately through depending tab 74 over large yarns i, h, f, out tab 77 and return over large yarns f, c, a, to tab 76, and return for over a, b, d, to tab 75 and return for over d, g, i, to complete tab 74 and the final pass of a repetitive cycle of passes.

It should be understood that while the showings of FIGS. 19 to 22 have the tabs extending in four directions, actual relative positions of the warp yarns in the textile machine would be run laterally much like in FIGS. 9 to 12 and in a plane to accommodate the shute that dispenses the transverse woof yarn 73.

With all the illustrations that have been given that several different patterns can be woven with the same and different size diameter yarns, varied in number within the filling center sections and in the tab portions or extensions, all according to the specifications and requirements for the assembly of the final composite structure with epoxy fabric layers extended over the sides of the gap filler.

The completed four tab gap fillers just described is shown being diagrammatically included in a composite structure in FIG. 17 wherein multiple layers 81, 82, 83 and 84 of graphite epoxy fabric have been assembled over the gap filler section and between the tab portion. While but a single fabric sheet is shown, it should be understood that it is intended to be illustrative of multiple layers built up over the areas. Between tabs 74 and 75 of the gap filler multiple layers 81 are adhered thereto, the tabs 75 and 76 layers 82, the tabs 76 and 77 layers 83, and finally between the tabs 77 and 75 there layers 84. The gap filler allows the multiple layers to be easily draped thereover into rounded corners while the tabs are adhered singly between the layers to maintain the shape of the filling yarn section With heat treatment this assembly is converted into a solid reinforced composite structural unit with embedded yarns through which forces are readily transmitted and distributed.

While various changes may be made in the detail construction, it shall be understood that such changes shall be within the spirit and scope of the present invention as defined by the appending claims.

What is claimed is:

1. A woven gap filler for use in the lay-up of composite plastic structural units comprising a plurality of longitudinally-extending filler warp yarns transversed by woof yarns and grouped to provide a multi-sided geometrical configuration over the cornerless sides of which lay-ups of multiple epoxy fabric sheets will be extended and heat treated to form there with a final hardened plastic structural unit.

2. A woven gap filler for use in the lay-up of composite plastic structural units as defined in claim 1 and tabs woven in conjunction with the multi-sided geometric configuration and extending laterally from the apexes thereof to lie flush between opposing lay-up of the opposing epoxy fiber sheets.

3. A woven gap filler for use in the lay-up of composite plastic structural units as defined in claim 2 and the warp yarns of the filler group being of larger diameter than the warp yarns of the laterally-extending tabs.

4. A woven gap filler for use in the lay-up of composite plastic structural units as defined in claim 1 and the gap filler being impregnated with polymer resin on epoxy corresponding to the impregnation of the epoxy lay-up fabric sheets to be heat treated and hardened therewith.

5. A woven gap filler for use in the lay-up of composite plastic structural units as defined in claims 1 and 2 or the warp and woof yarns being formed of carbon graphite fibers corresponding to the yarns of the epoxy fabric sheets.

6. A woven gap filler for use in the lay-up of composite plastic structural units as defined in claim 1 and group of filler yarns being a triangular shaped section with three sides and suitable for lay-up of T-section and I-beam of ribs and flanges.

7. A woven gap filler for use in the lay-up of composite plastic structural units as defined in claim 6 and the woven tabs extending from the apexes of the triangular section and adapted lie flush and embedded between opposing ribs and flanges.

8. A woven gap filler for use in the lay-up of composite plastic structural units as defined in claims 1, 2 or 3 and the group of filling yarns being diamond-shaped with the tabs from the four apexes thereof and adapted to lie flush and embedded between opposing lay-up of the multiple epoxy fabric sheets.

* * * * *